United States Patent [19]
Wilson

[11] 3,853,338
[45] Dec. 10, 1974

[54] COUPLING
[75] Inventor: William W. Wilson, Mississauga, Ontario, Canada
[73] Assignee: Rockwell International Corporation, Pittsburgh, Pa.
[22] Filed: Jan. 7, 1974
[21] Appl. No.: 431,260

Related U.S. Application Data
[60] Division of Ser. No. 276,553, July 31, 1972, abandoned, which is a continuation-in-part of Ser. No. 210,283, Dec. 20, 1971, abandoned, which is a continuation of Ser. No. 35,636, May 8, 1970, abandoned.

[52] U.S. Cl.................. 285/86, 285/337, 285/342, 285/DIG. 22
[51] Int. Cl............................................. F16l 21/04
[58] Field of Search ........ 285/81, 86, 337, DIG. 22, 285/345, 110, 354, 157, 342, 339

[56] References Cited
UNITED STATES PATENTS
| | | | |
|---|---|---|---|
| 2,822,191 | 2/1958 | Risley et al. | 285/337 X |
| 2,889,089 | 6/1959 | Herrick et al. | 285/DIG. 22 |
| 3,454,047 | 7/1969 | Johnston | 285/86 |
| 3,544,119 | 12/1970 | Glover | 285/345 X |
| 3,645,549 | 2/1972 | Glover | 285/110 X |

FOREIGN PATENTS OR APPLICATIONS
| | | | |
|---|---|---|---|
| 1,473,122 | 2/1967 | France | 285/DIG. 22 |
| 1,384,638 | 11/1964 | France | 285/DIG. 22 |
| 1,557,173 | 1/1969 | France | 285/81 |
| 855,603 | 12/1960 | Great Britain | 285/86 |
| 355,106 | 7/1961 | Switzerland | 285/337 |

Primary Examiner—Thomas F. Callaghan

[57] ABSTRACT

A coupling for joining telescopable members includes a connector slidably mounted on one of the members, a flange on the other of the members to co-operate in engaged relation with the connector, and sealing material wedged between the members.

1 Claim, 6 Drawing Figures

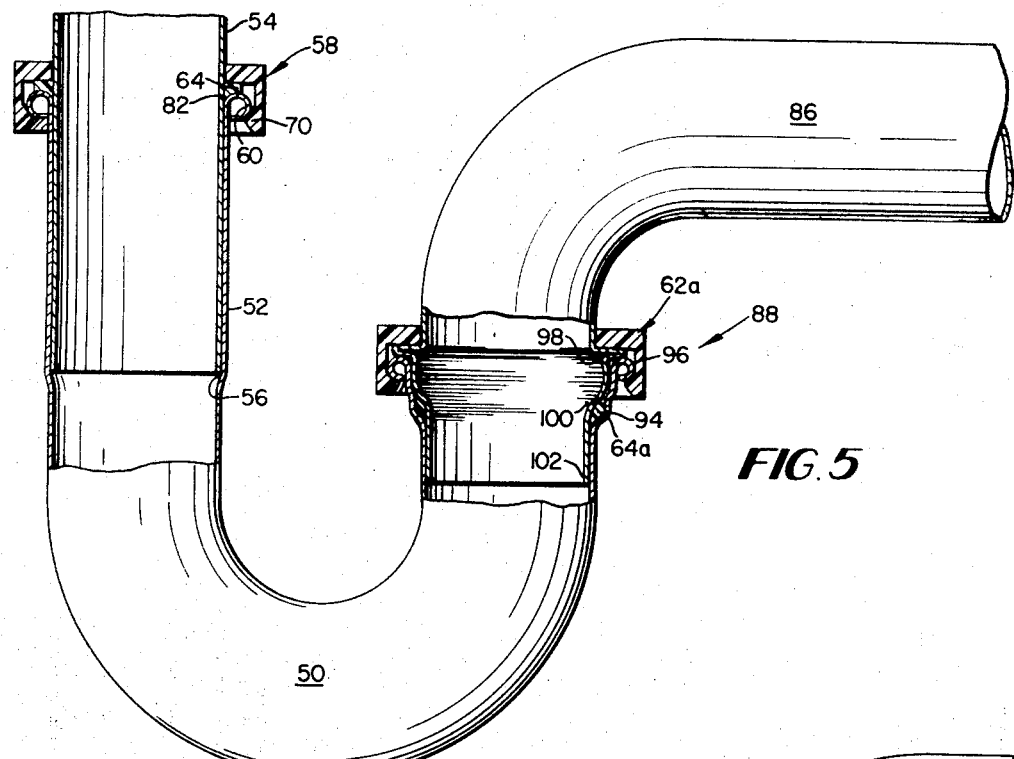
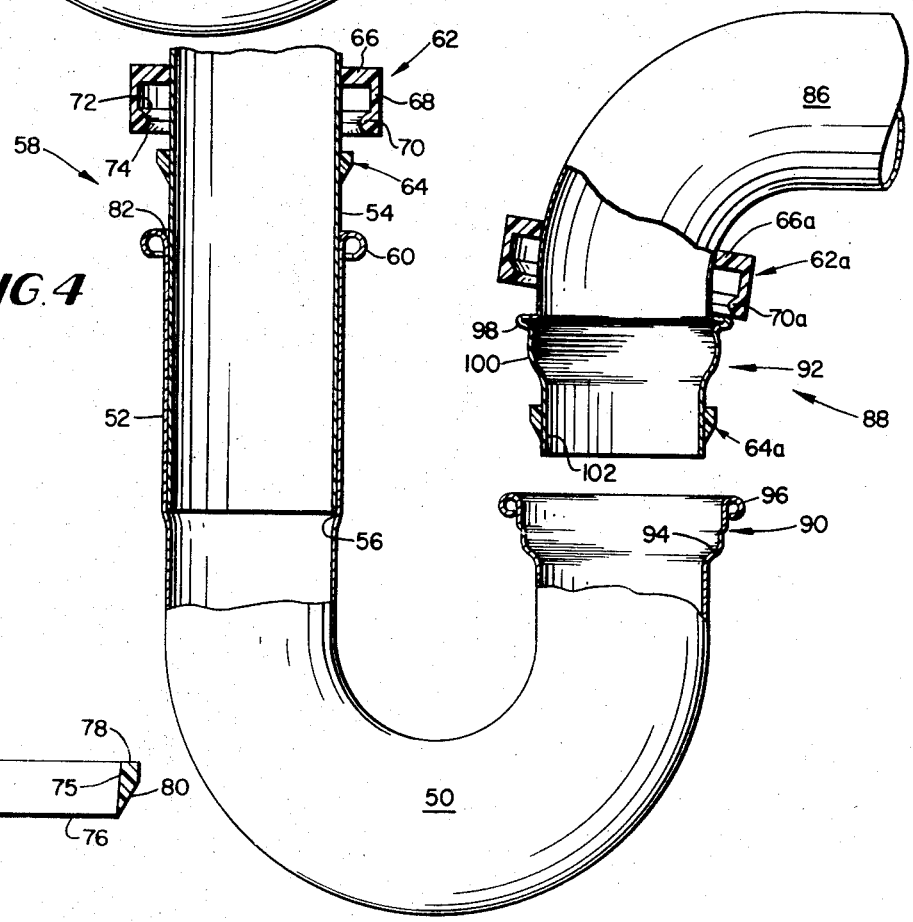

3,853,338

COUPLING

RELATED APPLICATIONS

This application is a division of application Ser. No. 276,553, filed July 31, 1972, which is a continuation-in-part of application Ser. No. 210,283, filed Dec. 20, 1971 which is a continuation of application Ser. No. 35,636, filed May 8, 1970, all three prior applications are now abandoned.

BACKGROUND AND SUMMARY OF THE INVENTION

This invention relates to couplings, more particularly to couplings for joining pipes to pipe fittings, for example.

In plumbing systems, particularly those conveying low pressure fluids, such as in sink drainlines, it is common practice to use slip nuts to join pipes and pipe fittings. Recently such nuts have been constructed of synthetic polymeric material. However, such slip nuts fitted on synthetic polymeric material threads require the use of heavy cross-sections, which result in bulky joints.

The present invention provides a joint for pipes and pipe fittings which does not employ a nut and thread, but at the same time is readily assemblable and disassemblable without the necessity of employing any tool and is not bulky.

The present invention is applicable to many types of telescopable members, such as brass pipes and synthetic polymeric material pipes conveying low pressure fluids. The couplings of the invention also may be used where an elbow, branch, inspection plug or joint plug has been included in a pipeline.

BRIEF DESCRIPTION OF THE DRAWINGS

FIG. 4 is a fragmentary, partially sectioned view of a preferred embodiment of the invention in which the coupling, shown disassembled, is employed at each end of a J-bend fitting such as that used in sink drains or the like;

FIG. 5 is a view similar to FIG. 4, but with the coupling parts assembled in their normal operative position; and FIG. 6 is an enlarged sectional view of the annular seal ring which forms part of the coupling, the seal ring being illustrated in its relaxed condition.

DETAILED DESCRIPTION OF SEVERAL EMBODIMENTS

Figure 1:
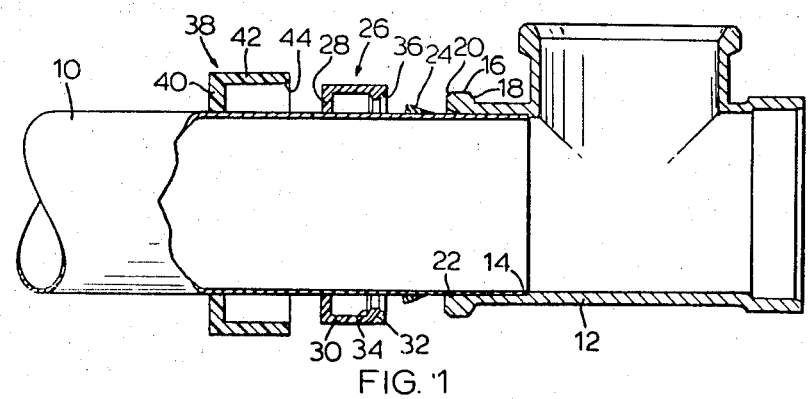
FIG. 1 is a view, partly in section of a coupling according to a first embodiment of the invention with the parts thereof disassembled.

In the drawings, a tube or pipe 10 snugly fits inside one outlet of a T-junction fitting 12, and the end of tube 10 abuts against an annular surface 14 formed in fitting 12. While this form of the invention is described with specific relation to a tube and a T-junction fitting, it is not limited thereto. The T-junction fitting 12 may be replaced by other types of fittings or a tube similar to tube 10, having a slightly larger or smaller diameter, whereby one tube may be telescoped in the other.

The tube 10 and the T-junction fitting 12 may be constructed of brass, polyethylene, polypropylene or any convenient material, preferably relatively rigid material.

The fitting 12 includes a radially outwardly extending integral flange 16 that may be separate from but rigid with the fitting 12. Flange 16 includes a first inclined annular face 18 and a second inclined annular face 20. Faces 18 and 20 are axially spaced and oppositely inclined and they diverge toward the interior of the fitting. In addition, flange 16 is cut away adjacent its radially inner extremity to provide an internal third inclined annular face 22 having its larger end open axially of the flange. The purpose of these inclined faces will become apparent hereinafter.

An annular wedge-shaped sealing element 24 preferably integrally constructed of resiliently deformable material, such as synthetic or natural rubber, is mounted in interference fit on the tube 10. The sealing element 24 may be moved over the surface of the tube 10 as will be apparent from a comparison of the position of element 24 in FIGS. 1 and 2.

An annular element 26 axially slidable on the surface of the tube 10 includes a first annular radial ring 28 having an axially extending annular skirt 30 integral with the outer radial extremity thereof at the end remote from fitting 12. The inner periphery 29 of ring 28 slidably engages tube 10. The skirt 30 terminates in an integral radially inwardly directed flange 32 also in the form of an annular ring.

The annular element 26 is preferably constructed of resiliently deformable material, such as polyethylene. In the embodiment shown, the annular element 26 is resiliently deformable and the fitting flange 16 is rigid. However, it is within the scope of the invention to provide the element 26 rigid and the flange 16 resiliently deformable. Alternatively, both the annular element 26 and the flange 16 may be resiliently deformable. It is necessary that at least one of such elements be resiliently deformable, as will become apparent hereinafter.

Flange 32 has two oppositely inclined axially spaced, radially inwardly converging faces 34 and 36 so arranged that the flange tapers towards tube 10.

A further annular element 38 axially slidable along the surface of the tube 10 includes an annular radial ring 40 having an axial skirt 42 integrally extending from the outer radial extremity thereof. The skirt 42 is tapered at 44 to provide an annular radially and axially outwardly inclined face at its open end. The purpose of this taper will be apparent from the following description. Ring 40 has its inner periphery 39 slidably engaging tube 10.

The annular element 38 is constructed of a rigid material, generally a rigid synthetic polymeric material such as high molecular weight polyethylene, polypropylene, ABS etc.

To assemble the coupling, the annular member 26 is moved along the tube 10 towards fitting 12. Such movement pushes the sealing element 24 along the tube. Eventually, the inclined face 36 engages the inclined face 20, and the face 36 rides up the race 20 and the element 26 passes over flange 16 until face 34 may engage face 18 when the resilience in the system will be released and face 34 will pass down face 18 and the element 26 and fitting 12 will snap-fit together. At the same time, the inclined surface of resilient sealing element 24 will be forced against the face 22. The relative location of the elements in this locked position is shown in FIGS. 2 and 3.

Figure 2:
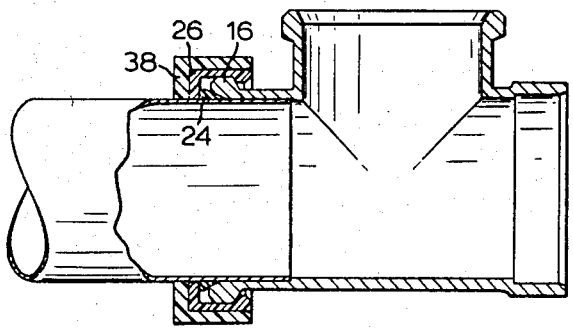
FIG. 2 shows the embodiment of FIG. 1 with the parts assembled.
Figure 3:
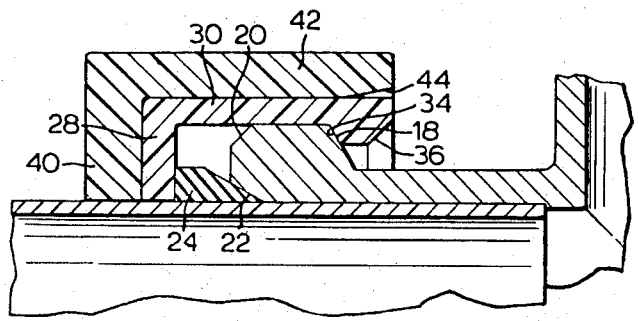
FIG. 3 is a fragmentary enlarged view of part of the assembled coupling shown in FIG. 2.

It is not essential to the embodiment of FIGS. 1–3 that inclined faces 20 and 36 be provided. However, the provision of such inclined faces is preferred in order to facilitate the assembly of the coupling.

In accordance with the embodiment of FIGS. 1–3, the inclined faces 18 and 34 are provided. The presence of such faces renders disassembly of the coupling considerably easier than if they were omitted. However, their presence is not essential, although it is preferred as a practical matter to provide such surfaces.

The annular element 38 is passed over the coupling parts assembled in accordance with the above described procedure. The taper 44 aids in flaring the open end of element 38 during the passage of the skirt 42 over the skirt 30. In the assembled position, see FIG. 3 especially, the inner periphery of the skirt 42 closely surrounds the outer periphery of the skirt 30, and the ring 40 axially abuts the ring 28. It is preferred that the annular element 38 be in interference fit with the annular element 26. Since the annular element 38 is constructed of more rigid material than element 26, the coupling assembly is rendered much stronger by the presence of annular element 38 in that the coupling assembly is not accidentally disassemblable through the accidental deformation of element 26.

As noted above it is not essential for there to be provided cooperating inclined faces 18 and 34. It is further not essential for there to be present inclined faces 20 and 36. It is preferred, however, that all such inclined faces be provided in order to facilitate both assembly and disassembly of the coupling. Similarly, the element 38 is not essential to the embodiment of the invention in FIGS. 1–3, but its presence is preferred.

In the embodiment disclosed in FIGS. 1–3, tube 10 and fitting 12 are usually metal, sealing element 24 is resiliently deformable to provide a packing function, element 26 is fairly stiff although resiliently active to be axially forced to interfit with flange 16, and element 38 may be metal or relatively stiff plastic.

Referring now to FIGS. 4 to 6, a rigid metallic J-bend fitting or trap 50, such as that used in sink drains or the like, has a slightly enlarged fluid inlet end, pipe section 52, which telescopically receives a vertical metallic pipe or tailpiece 54, the upper end of which is connected to a sink drain in conventional fashion. The lower end of pipe 54 may abut against the inner axially facing shoulder 56 of pipe section 52, depending upon the length or height of pipe 54 in the particular installation.

A coupling assembly 58 by which tailpiece 54 is retained in assembled relationship with pipe section 52 includes an integral rolled flange 60 formed on the outer terminal end of section 52, an annular element or clip nut 62 axially slidable along tailpiece 54, and a tapered or wedge-shaped annular sealing ring 64 which in the FIG. 5 condition forms a fluid seal between tailpiece 54 and end section 52. The axially opposite surfaces of flange 60 provide effectively relatively inclined surfaces for assembly convenience.

Clip nut 62 includes a first annular radial ring 66 the inner periphery of which slidably surrounds pipe 54, and an axially extending skirt 68 integrally formed with the outer radial extremity of ring 66, with skirt 68 terminating in an integral radially inwardly directed annular flange 70. Flange 70 has an opposed pair of radially inwardly converging faces 72 and 74 so arranged that the flange generally tapers toward tailpiece 54 to facilitate movement of flange 70 to and from locking engagement with flange 60. Face 72 preferably is slightly curved or rounded in general correspondence with the rounded configuration of rolled flange 60.

Flanges 60 and 70 are dimensioned to overlap radially so that they snap to and from the interlocked position of FIG. 5. Clip nut 62 is preferably constructed as by molding of a relatively rigid, but sufficiently resilient plastic material so that annular flange 70 and skirt 68 may radially expand and contract to permit flange 70 to pass over and become interlocked over flange 60.

In an alternate construction of clip nut 62, flange 70 need not be of continuous annular form, but may be interrupted periodically to provide a number of internal ribs. This alternate construction has a greater degree of radial flexibility and requires less force to lock and unlock clip nut 62 over flange 60.

As best shown in FIG. 6, a flexible, deformable, annular, generally wedged-shaped sealing ring 64, has in its relaxed condition an internal surface 75 that tapers slightly outwardly from its reduced cross section radially thinner forward end 76 to a rearward axially facing opposite end surface 78 of the ring. Ring 64 is sized internally to provide the ring with an interference fit on tailpiece pipe 54, and the ring 64 also has an external rearwardly outwardly tapered surface 80. Ring 64 is made of a highly resilient, deformable material, such as rubber synthetic plastic or other suitable material, and when forced along tailpiece 54 by the clip nut, adopts the configuration shown in FIG. 4. The reduced forward end 76 of ring 64 is adapted to be snugly wedged and sealingly confined in an annular channel 82 radially defined by outer curved surface of rolled flange 60 and the exterior wall surface of tailpiece 54.

Coupling assembly 58 is locked together merely by axially sliding clip nut 62 and seal ring 64 along tailpiece 54 toward flange 60, and forcing flange 70 over flange 60 whereby it snaps into the locked position shown in FIG. 5. The rolled configuration of flange 60 and the tapered surface 74 of flange 70 facilitate movement of clip nut 62 into its locked position. In this position, the small end 76 of seal ring 64 is tightly sealingly wedged within channel 82 and the remainder of the seal ring is compressed and deformed between the flange 60 and ring 66 and skirt 68 of the clip nut 62. Pipe section 52, tail piece 54, and coupling assembly 58 are retained locked together in the FIG. 5 position by engagement of flange 70 around the rolled flange 60 until clip nut 62 is deliberately axially forced away from fitting flange 60.

The outlet end of J-bend fitting 50 is coupled to a wall tube or pipe 86 by way of a coupling assembly 88 which includes an enlarged shaped end section 90 formed integrally on the outlet end of fitting 50, a shaped end section 92 formed integrally on the end of pipe 86 that telescopes within section 90, and a clip nut 62a and seal ring 64a which are preferably identical respectively to clip nut 62 and seal ring 64 described above.

The shaped end section 90 of fitting 50 constitutes a diametrically enlarged wall surface 94 which expands outwardly from the normal diameter of fitting 50 and terminates in an externally rolled end flange 96.

The shaped end section 92 of tube 86 constitutes an enlarged radial flange 98, formed by reversely bending a portion of the wall material of tube 86 and a curved wall section 100 extending generally radially inwardly from flange 98 and terminating in a tubular end section 102 which has an external diameter slightly less than the normal internal diameter of fitting 50 so as to be snugly telescopically received within the fitting. The curved wall section 100 is sized to fit within wall section 94 with clearance to form a channel within which seal ring 64a is received, and the flange 98 is usually of smaller diameter than the maximum diameter of flange 96, but is of sufficient size so that it may axially abut against flange 96 in the assembly as shown in FIG. 5.

To connect wall tube 86 with fitting 50 as shown in FIG. 5, clip nut 62a is first placed over the outlet end of tube 86 and slid along the tube to the position generally shown in FIG. 4. Seal ring 64a may then be placed and oriented on tubular end section 102 as shown in FIG. 4, or may be placed within flange section 90 with its reduced cross section thinner forward end leading into or facing the fitting 50. Tubular section 102 is then inserted into fitting 50 and shaped sections 90 and 92 are axially forced together, compressing and deforming the seal ring 64a, until flanges 96 and 98 abut one another. Clip nut 62a is then forced axially along tube 86 until its ring 66a radially abuts the rear surface of flange 98 and its resileint flange 70a locks around the radially overlapping rolled flange 96. In the locked position of FIG. 5, seal ring 64a is wedged within the clearance between wall surfaces 94 and 100 and provides a tight seal against leakage of fluid passing between fitting 50 and wall tube 86.

Where the pipes and fittings are of metal, the elements 26, 62 and 62a are advantageously of polyethylene which has good bearing qualities and besides facilitating slidable assembly may conform to changes in pipe dimensions with temperature.

It is apparent from the description above that the coupling assembly, in its various embodiments, may be quickly connected and disconnected, while at the same time in its assembled state advantageously provides a very tight and adequate fluid seal around the fluid joint formed between the telescoping pipe members.

It is also apparent that a coupling is provided which does not involve the use of screw threads and nuts and has particular applicability to low fluid pressure joints.

The coupling is illustrated for tubes of approximately equal diameter. It is possible to provide couplings for tubes having different diamters by simple modification. Thus, in the embodiment of FIGS. 1–3, if tube 10 is of much smaller diameter than fitting 12, a different sealing element 24 is required having a portion which will be located in interference fit between the inner surface of element 12 and the outer surface of tube 10.

In addition, the coupling is illustrated for circular cross-section tubes. It is possible within the scope of the invention to provide couplings for any desired cross-section of tube, for example, square, hexagonal etc.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A coupling for connecting a first member telescoped within a second member comprising, a connector slidably mounted on said first member and having a continuous skirt portion spaced from said member and extending from an end closure through which said first member passes in sliding relation towards an open end of said connector, a resiliently deformable first flange depending from said skirt portion inwardly towards said first member, a second flange intergral with said second member and depending outwardly from said second member, the relative depths of said flanges being such that they overlap each other, said second flange including an inclined surface which forms with said first member a wedge-shaped channel, said first flange having a face inclined in a direction outwardly from said skirt portion towards said open end, said second flange having a face correspondingly inclined, said inclined faces registering with each other when said second flange is disposed inwardly of said first flange relative to said open end, in which position said flanges overlap one another thereby inhibiting removal of said connector from engagement with said second flange, said inclined faces allowing the face on said first flange to ride up the inclined face on said second flange as said first flange resiliently deforms to aid removal of said connector from engagement with said second flange if sufficient opposed force is applied between the connector and the second member, said first flange including a second inclined face whereby said first flange tapers towards said first member, and said second flange has a further inclined face inclined correspondingly to said second face on said first flange whereby said second flange tapers away from said second member, a rigid cover member slidably mounted on said first member, said cover member including a skirt portion extending from an end closure through which said first member passes in sliding relation towards an open end of said cover member, said cover member overlying and engaging said connector, the inner surface of said skirt and end closure of said cover member engaging the outer surface of said skirt and end closure of said connector respectively, thereby inhibiting removal of said connector from engagement with said second flange without removal of said cover member, and wedge-shaped sealing material wedged in said wedge shaped channel between said first and second members and held in position by engagement with the inner wall of the end closure of said connector and through the connector holding the flanges in engagement.

* * * * *